(12) United States Patent
Sakamoto et al.

(10) Patent No.: US 11,078,876 B2
(45) Date of Patent: Aug. 3, 2021

(54) RELIEF VALVE DETERMINATION DEVICE FOR HIGH-PRESSURE FUEL SUPPLY SYSTEM

(71) Applicants: DENSO CORPORATION, Kariya (JP); MAZDA MOTOR CORPORATION, Hiroshima (JP)

(72) Inventors: Yuri Sakamoto, Kariya (JP); Tomohiro Kanaya, Kariya (JP); Takafumi Nishio, Otake (JP)

(73) Assignees: DENSO CORPORATION, Kariya (JP); MAZDA MOTOR CORPORATION, Hiroshima (JP)

( * ) Notice: Subject to any disclaimer, the term of this patent is extended or adjusted under 35 U.S.C. 154(b) by 105 days.

(21) Appl. No.: 16/660,053

(22) Filed: Oct. 22, 2019

(65) Prior Publication Data

US 2020/0049115 A1     Feb. 13, 2020

Related U.S. Application Data

(63) Continuation of application No. PCT/JP2018/012363, filed on Mar. 27, 2018.

(30) Foreign Application Priority Data

Apr. 24, 2017 (JP) .............................. JP2017-085483

(51) Int. Cl.
*F02M 57/00* (2006.01)
*F16K 37/00* (2006.01)
*G01M 15/09* (2006.01)

(52) U.S. Cl.
CPC ....... *F02M 57/005* (2013.01); *F16K 37/0066* (2013.01); *G01M 15/09* (2013.01)

(58) Field of Classification Search
CPC ............. F02M 57/005; F02M 63/0225; F02M 63/005; F16K 37/0066; F16K 37/0091; G01M 15/09; F02D 41/22
See application file for complete search history.

(56) References Cited

U.S. PATENT DOCUMENTS

| | | | |
|---|---|---|---|
| 7,706,962 B2 * | 4/2010 | Fushiki | F02D 41/3863 701/114 |
| 9,376,989 B2 * | 6/2016 | Peters | F02M 25/08 |
| 2009/0240417 A1 * | 9/2009 | Fushiki | F02M 65/003 701/103 |

FOREIGN PATENT DOCUMENTS

| | | |
|---|---|---|
| JP | 3610894 | 1/2005 |
| JP | 2010-25102 | 2/2010 |

* cited by examiner

*Primary Examiner* — Freddie Kirkland, III
(74) *Attorney, Agent, or Firm* — Nixon & Vanderhye P.C.

(57) ABSTRACT

An estimation unit estimates a fuel pressure on a discharge side of a high-pressure pump based on an amount of fuel injection with a fuel injection valve from a time point at which a detected fuel pressure changes from a higher status than a first pressure to a lower status, assuming that the fuel has not been discharged with the high-pressure pump. The determination unit determines that a relief valve is in an open status based on a dropping mode of the estimated fuel pressure and a dropping mode of the detected fuel pressure.

10 Claims, 7 Drawing Sheets

RELIEF VALVE DETERMINATION DEVICE FOR HIGH-PRESSURE FUEL SUPPLY SYSTEM

CROSS REFERENCE TO RELATED APPLICATION

The present application is a continuation application of International Patent Application No. PCT/JP2018/012363 filed on Mar. 27, 2018, which designated the U.S. and claims the benefit of priority from Japanese Patent Application No. 2017-85483 filed on Apr. 24, 2017. The entire disclosures of all of the above applications are incorporated herein by reference.

TECHNICAL FIELD

The present disclosure relates to a relief valve determination device.

BACKGROUND

Conventionally, a relief valve is provided to an outlet of a high-pressure pump to release fuel in the outlet thereby to protect the high-pressure pump and the outlet from breakage due to overpressure.

SUMMARY

According to one aspect of the present disclosure, a relief valve determination device is configured to determine that a relief valve is in an open status in a high-pressure fuel supply system.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Hereinafter, one example of the present disclosure will be described.

A device according to the example feed-back controls a discharge amount of a high-pressure pump so as to bring fuel pressure detected with a fuel pressure sensor into correspondence with a target fuel pressure, based on a comparison value between an integrated value of the discharge amount of the high-pressure pump and an integrated value of fuel injection amount with a fuel injection valve during a predetermined period and the fuel pressure detected with the fuel pressure sensor. The device may determine presence/absence of abnormality in a high-pressure fuel supply system.

This example makes the determination on the assumption that the discharge amount of the high-pressure pump is subjected to the feed-back control. More specifically, this example utilizes in the determination the fact that, e.g., when fuel leakage occurs, the discharge amount of the high-pressure pump increases due to the feed-back control. Accordingly, this example, when the discharge amount of the high-pressure pump is not feed-back controlled, cannot determine the presence/absence of abnormality in the high-pressure fuel supply system.

According to one example of the present disclosure, a relief valve determination device is configured to determine that a relief valve is in an open status in a high-pressure fuel supply system. The high-pressure fuel supply system includes: a fuel injection valve configured to inject fuel; a high-pressure pump configured to pressurize the fuel and to discharge the fuel to a supply path that is directed to the fuel injection valve; a pressure sensor configured to detect a fuel pressure on a discharge side of the high-pressure pump; and the relief valve configured to become in an open status, when the fuel pressure on the discharge side is higher than a valve open pressure, to decrease the fuel pressure on the discharge side to a predetermined pressure. The relief valve determination device comprises an estimation unit configured to estimate the fuel pressure on the discharge side based on an amount of fuel injection with the fuel injection valve from a time point where the fuel pressure detected with the pressure sensor changes from a higher status than a first pressure, which is set to be lower than the valve open pressure, to a lower status, assuming that the fuel is not discharged with the high-pressure pump. The relief valve determination device further comprises a determination unit configured to determine that the relief valve is in the open status based on a dropping mode of the fuel pressure estimated with the estimation unit and a dropping mode of the fuel pressure detected with the pressure sensor.

According to this configuration, the fuel is pressurized with the high-pressure pump, and is discharged to the supply path to the fuel injection valve. Subsequently, the fuel is injected with the fuel injection valve. Further, the fuel pressure on the discharge side of the high-pressure pump is detected with the pressure sensor. When the fuel pressure on the discharge side of the high-pressure pump is higher than the valve open pressure, the relief valve becomes in the open status and the fuel pressure on the discharge side decreases to predetermined pressure.

Note that the estimation unit estimates the fuel pressure on the discharge side based on the fuel injection amount with the fuel injection valve on the assumption that the fuel has not been discharged with the high-pressure pump from a time point at which the fuel pressure detected with the pressure sensor changes from a higher status than the first pressure set to be lower than the valve open pressure to the lower status. That is, when the fuel pressure on the discharge side decreases below the first pressure, in a status where the fuel is not discharged with the high-pressure pump, the dropping fuel pressure on the discharge side is estimated only with fuel injection with the fuel injection valve. For example, when the relief valve is in the closed status and the fuel is discharged with the high-pressure pump, the fuel pressure on the discharge side detected with the pressure sensor changes while it is equal to or higher than the fuel pressure on the discharge side estimated with the estimation unit. On the other hand, when the relief valve is in the open status, regardless of whether the fuel is discharged with the high-pressure pump or not, the fuel pressure on the discharge side detected with the pressure sensor changes while it is lower than the fuel pressure on the discharge side estimated with the estimation unit.

Accordingly, the determination unit determines that the relief valve is in the open status based on the dropping mode of the fuel pressure estimated with the estimation unit and the dropping mode of the fuel pressure detected with the pressure sensor. Further, as the estimation unit estimates the fuel pressure on the discharge side on the assumption that the fuel is not discharged with the high-pressure pump, it is not necessary to perform the estimation on the assumption of feed-back control of the discharge amount of the high-pressure pump. Accordingly, even when the discharge amount of the high-pressure pump is not feed-back controlled (when the feed-back control does not normally work), it is possible to determine that the relief valve is in the open status. Note that when the discharge amount of the high-pressure pump is feed-back controlled, it is possible to similarly determine that the relief valve is in the open status.

First Embodiment

Hereinbelow, a first embodiment implemented as a four-cylinder gasoline engine (internal combustion engine) will be described with reference to the drawings.

Figure 1:
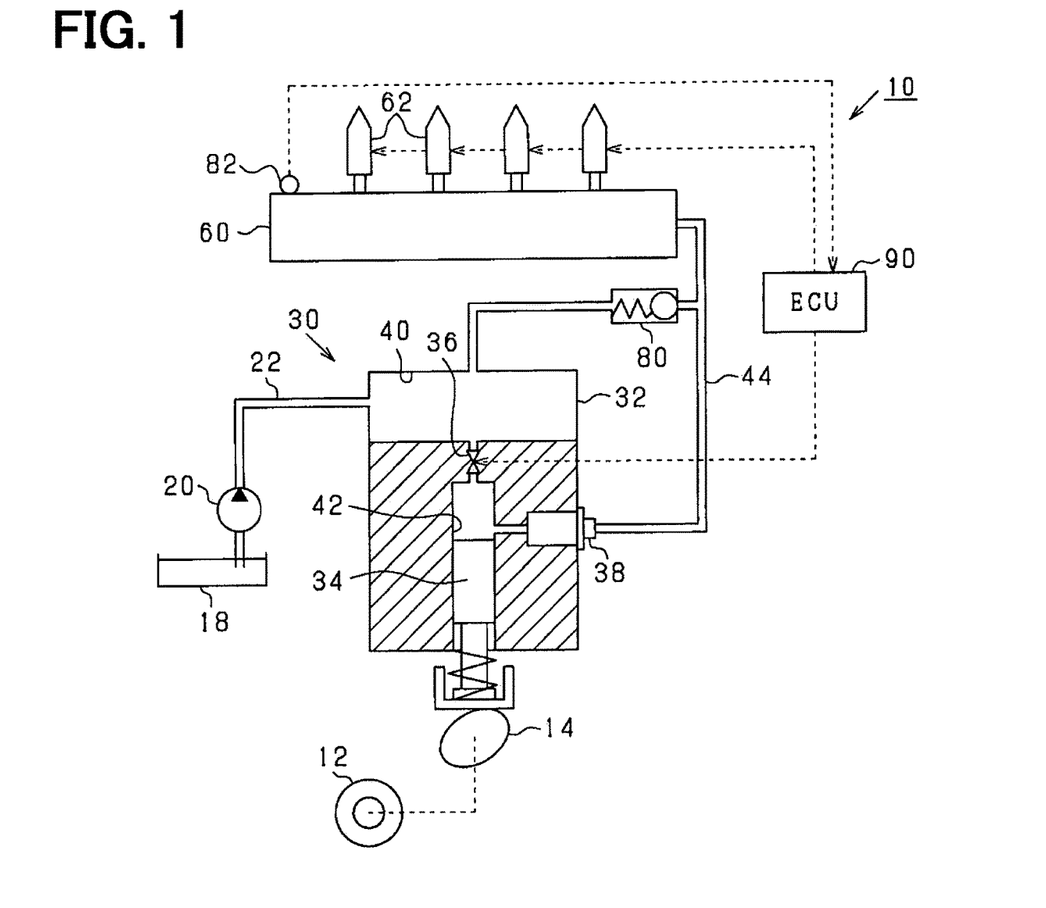
FIG. 1 is a schematic diagram showing an engine and its peripheral configuration.

As shown in FIG. 1, an engine 10 has a crankshaft 12 (driving shaft), a cam 14, a low-pressure pump 20, a high-pressure pump 30, a delivery pipe 60, a fuel injection valve 62, a relief valve 80, a pressure sensor 82, and the like. The cam 14 is driven by rotation of the crankshaft 12.

The low-pressure pump 20 sucks fuel in a fuel tank 18, pressurizes the fuel, and discharges the fuel. The pressure of the fuel discharged with the low-pressure pump 20 is controlled with a regulator (not shown) or the like.

The high-pressure pump 30 has a cylinder body 32, a plunger 34, a flow control valve 36, a discharge valve 38, and the like.

A low-pressure chamber 40 and a pressure chamber 42 are formed in the cylinder body 32. The fuel discharged with the low-pressure pump 20 is supplied via piping 22 to the low-pressure chamber 40 (predetermined chamber). That is, the fuel discharged with the low-pressure pump 20 is stored in the low-pressure chamber 40. The low-pressure chamber 40 and the pressure chamber 42 are connected to each other via the flow control valve 36. The flow control valve 36 switches between breakage and communication between the low-pressure chamber 40 and the pressure chamber 42. The driving status of the flow control valve 36 is controlled with an ECU (Electronic Control Unit) 90.

The plunger 34 is reciprocate-movably supported with the cylinder body 32. The plunger 34 is driven and reciprocated by rotation of the cam 14. With the reciprocating movement of the plunger 34, the fuel is drawn from the low-pressure chamber 40 into the pressure chamber 42, and the fuel in the pressure chamber 42 is pressurized. The fuel pressurized in the pressure chamber 42 is discharged via the discharge valve 38 to a piping 44 (corresponding to a supply path). Subsequently, the fuel is supplied through the piping 44 to the delivery pipe 60, and to the fuel injection valve 62. The discharge valve 38 is a check valve to pass the fuel only in a direction from the pressure chamber 42 to the piping 44. The discharge valve 38 is opened when the fuel pressure in the pressure chamber 42 becomes equal to or higher than predetermined discharge pressure.

The delivery pipe 60 (accumulator) holds the fuel discharged with the high-pressure pump 30 in a pressurized status. The pressure sensor 82 detects the fuel pressure in the delivery pipe 60 (i.e. on the discharge side of the high-pressure pump 30). The fuel pressure detected with the pressure sensor 82 (hereinbelow, referred to as "detection pressure Pm") is inputted into the ECU 90. Note that the pressure sensor 82 may detect the fuel pressure in the piping 44 or the fuel pressure in the fuel injection valve 62.

The relief valve 80 is opened (becomes in an open status) when the fuel pressure in the delivery pipe 60 (piping 44) is higher than the valve open pressure, to return the fuel in the delivery pipe 60 to the low-pressure chamber 40. The valve open pressure is set to be lower than a withstand pressure (rail withstand pressure) before deterioration (fatigue) causes in the delivery pipe 60. The fuel pressure in the low-pressure chamber 40 is a predetermined pressure lower than the fuel pressure in the pressure chamber 42. When the relief valve 80 is opened once, the fuel pressure in the delivery pipe 60 is maintained at around the fuel pressure in the low-pressure chamber 40 (predetermined pressure).

The delivery pipe 60 is connected to four fuel injection valves 62. The fuel injection valve 62 directly injects the fuel in the delivery pipe 60 into the cylinder of the engine 10. The driving status of the fuel injection valve 62 is controlled with the ECU 90. Note that the fuel injection valve 62, the delivery pipe 60, the piping 44, the high-pressure pump 30, the piping 22, the low-pressure pump 20, the pressure sensor 82, and the relief valve 80 form the high-pressure fuel supply system.

The ECU 90 (corresponding to the relief valve determination device) is a microcomputer having a CPU, a ROM, a RAM, a driving circuit, an input/output interface and the like. The ECU 90 is an engine ECU to control the running status of the engine 10, or the like. The ECU 90 performs an idle speed control to maintain an idle speed of the engine 10 at a target idle speed, or the like. The ECU 90 controls the driving status of the flow control valve 36 (i.e. the discharge amount of the high-pressure pump 30) so as to bring the detection pressure Pm into correspondence with the target fuel pressure.

Next, the operation of the high-pressure pump 30 will be described.

(1) Intake Stroke

The fuel is drawn from the low-pressure chamber 40 to the pressure chamber 42 based on the descent of the plunger 34 and the reduction of the fuel pressure in the pressure chamber 42. Subsequently, the flow control valve 36 is controlled with the ECU 90 so as to maintain the valve open status.

(2) Blow Back Stroke

In the status where the flow control valve 36 is opened, even when the plunger 34 moves upward from the bottom dead point toward the top dead point, the fuel in the pressure chamber 42, pressurized with the plunger 34, is returned via the flow control valve 36 to the low-pressure chamber 40.

(3) Pressurizing Stroke

In the blow back stroke, the flow control valve 36 is controlled to be opened with the ECU 90. In this status, when the plunger 34 further moves toward the top dead point, the fuel in the pressure chamber 42 is pressurized, and the fuel pressure rises. When the fuel pressure in the pressure chamber 42 becomes equal to or higher than predetermined discharge pressure, the discharge valve 38 is opened. The fuel discharged from the discharge valve 38 is supplied to the delivery pipe 60, then is stored in the pressurized status, and supplied to the fuel injection valve 62.

By repeating the above-described strokes (1) to (3), the high-pressure pump 30 pressurizes the drawn fuel and discharges the fuel. The discharge amount of the fuel is controlled by controlling valve closing timing of the flow control valve 36.

Figure 2:
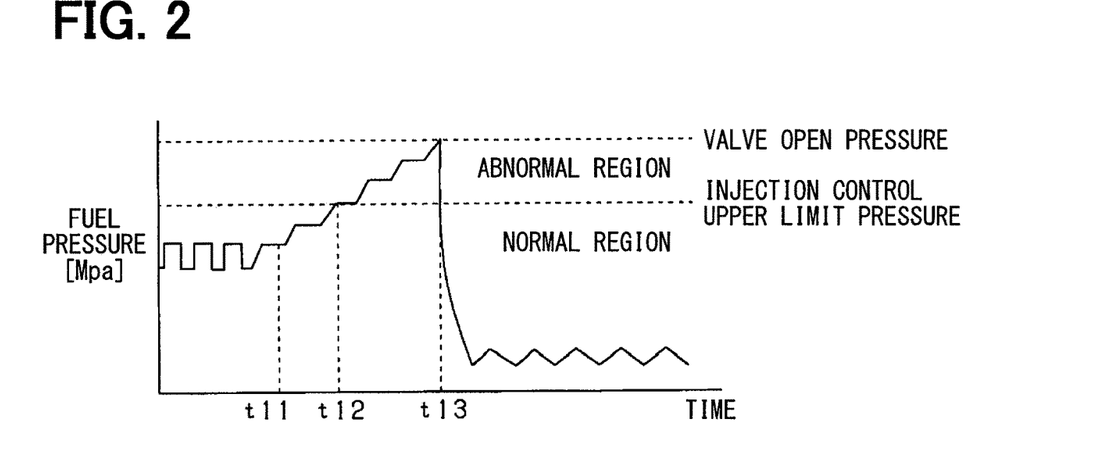
FIG. 2 is a diagram showing a fuel pressure change when the relief valve becomes in an open status.

FIG. 2 is a diagram showing a fuel pressure change when the relief valve 80 becomes in the open status. In the drawing, at time t11, the high-pressure pump 30 breaks down, and becomes in a status to continuously discharge the fuel in the maximum amount. At and after the time t11, the fuel pressure in the delivery pipe 60 rises upon every discharge with the high-pressure pump 30. At time t12, the pressure becomes upper limit pressure to which the injection with the fuel injection valve 62 is controllable (injection control upper limit pressure). Thereafter, at time t13, the fuel pressure reaches the valve open pressure of the relief valve 80, and the relief valve 80 is in the open status. As the relief valve 80 is in the open status, the fuel pressure in the delivery pipe 60 decreases to around the fuel pressure in the low-pressure chamber 40 and maintained at a pressure to balance the discharge amount of the fuel and a blow-back amount blown-back through the relief valve 80. A region where the fuel pressure is equal to or lower than the injection control upper limit pressure is a normal region. A region where the fuel pressure is higher than the injection control upper limit pressure is an abnormal region.

The ECU 90 controls the amount of fuel discharge with the high-pressure pump 30 to "0" when the detection pressure Pm detected with the pressure sensor 82 exceeds the injection control upper limit pressure. The ECU 90 resumes the control to bring the detection pressure Pm into correspondence with the target fuel pressure when the detection pressure Pm becomes lower than a return pressure set to be lower than the injection control upper limit pressure. Note that as shown in FIG. 2, when the high-pressure pump 30 breaks down, even when the detection pressure Pm exceeds the injection control upper limit pressure, it is impossible to control the amount of fuel discharge with the high-pressure pump 30 to "0". Accordingly, the fuel pressure in the delivery pipe 60 rises and becomes the valve open pressure of the relief valve 80, and the relief valve 80 becomes in the open status.

In the present embodiment, when the detection pressure Pm changes from a higher status than the first pressure set to be lower than the valve open pressure to a lower status, the ECU 90 determines whether or not the relief valve 80 is in the open status.

Figure 3:
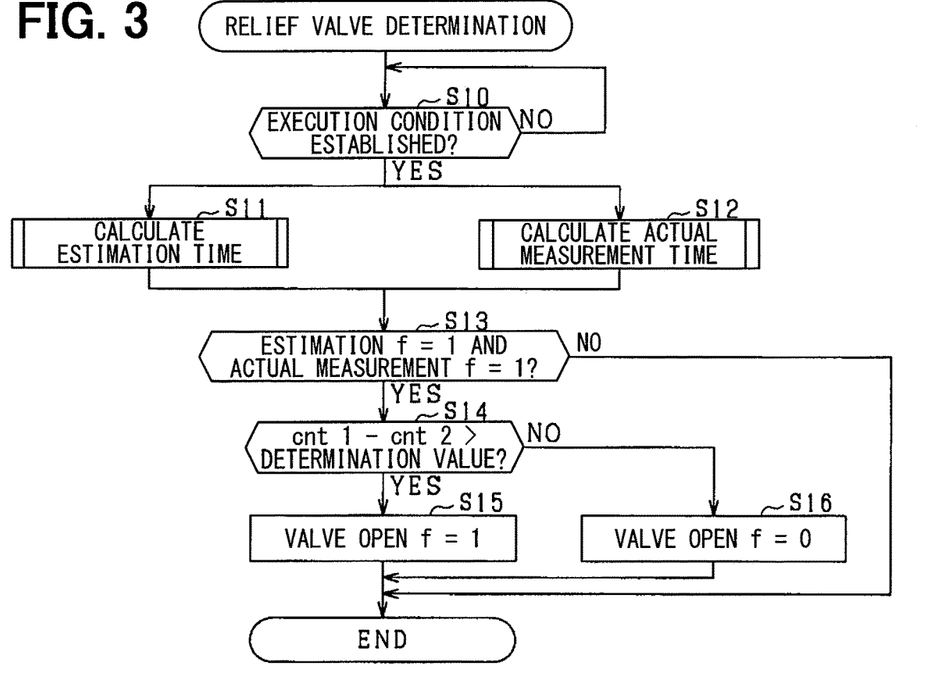
FIG. 3 is a flowchart showing a procedure of relief valve determination according to a first embodiment.

FIG. 3 is a flowchart showing a procedure of a relief valve determination according to the present embodiment. This series of processing is performed with the ECU 90.

First, it is determined whether or not the execution condition for the relief valve determination is established (S10). More particularly, when an execution condition 2 including an execution condition 1 is established, it is determined that the execution condition for the relief valve determination is established. When the execution condition 2 is not established, it is determined that the execution condition for the relief valve determination is not established. As the execution condition 1, it is determined whether or not the detection pressure Pm detected with the pressure sensor 82 has exceeded pressure FP0 set to be lower than the valve open pressure of the relief valve 80. As the execution condition 2, it is determined whether or not after the establishment of the execution condition 1, the detection pressure Pm has become lower than start pressure FP1 (corresponding to the first pressure) set to be lower than pressure FP0. The start pressure FP1 is set such that, even when the detection pressure Pm is lower than the fuel pressure which acts on the relief valve 80, the detection pressure Pm becomes higher than the start pressure FP1 at a moment where the relief valve 80 has become in the open status.

In the determination at S10, on determination that the execution condition for the relief valve determination is not established (S10: NO), the processing at S10 is performed again. On the other hand, in the determination at S10, on determination that the execution condition for the relief valve determination is established (S10: YES), estimation time calculation (S11) and actual measurement time calculation (S12) are performed in parallel. Note that it may be configured such that one of the estimation time calculation (S11) and the actual measurement time calculation (S12) is performed, and then the other calculation is performed.

Figure 4:
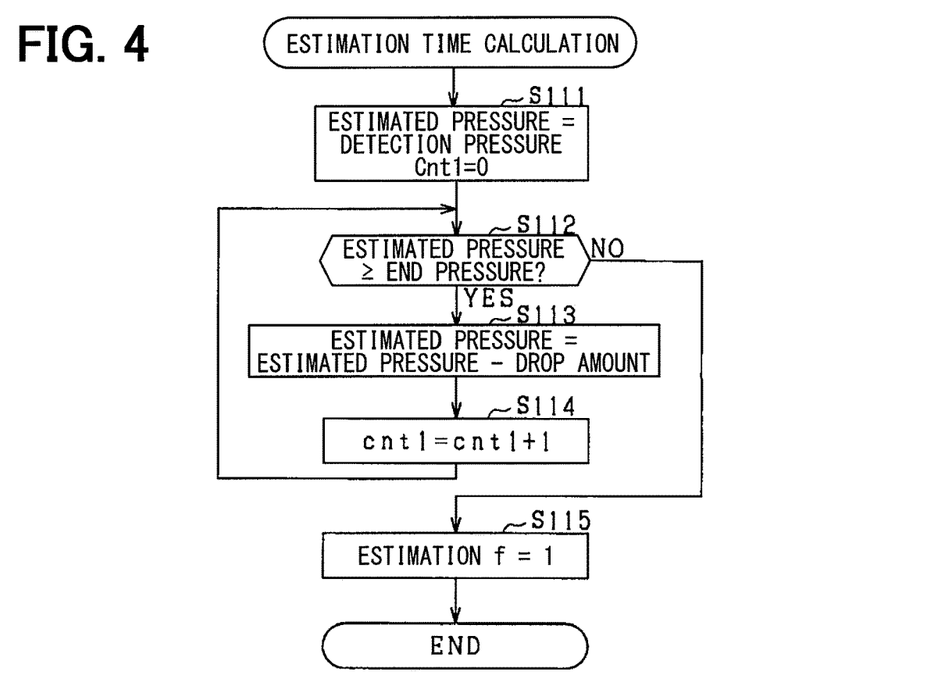
FIG. 4 is a flowchart showing a procedure of estimation time calculation according to the first embodiment.

FIG. 4 is a flowchart showing a procedure of the estimation time calculation according to the present embodiment. This series of processing is performed with the ECU 90.

The detection pressure Pm detected with the pressure sensor 82 is set as an initial value of an estimated pressure Pe, and a count cnt1 is set to "0" (S111). It is determined whether or not the estimated pressure Pe is equal to or higher than an end pressure FP2 (corresponding to second pressure) set to be lower than the start pressure FP1 (S112). The end pressure FP2 is set such that when the relief valve 80 becomes in the open status, the range from the start pressure FP1 to the end pressure FP2 corresponds to the range where the detection pressure Pm linearly drops.

In the determination at S112, on determination that the estimated pressure Pe is equal to or higher than the end pressure FP2 (S112: YES), the estimated pressure Pe is set as a pressure obtained by subtracting a drop amount ΔP from the estimated pressure Pe (S113). The drop amount ΔP is an amount of dropping of the fuel pressure in the delivery pipe 60 by one fuel injection with the fuel injection valve 62, i.e., by 180° C.A (Crank Angle). That is, assuming that the fuel is not discharged with the high-pressure pump 30, the estimated pressure Pe is estimated based on the amount of fuel injection with the fuel injection valve 62. The drop amount ΔP is calculated with the following expression.

$$\Delta P = q \times K \times A / V$$

In the above expression, q is a fuel injection amount at once with the fuel injection valve 62. K is a bulk modulus of elasticity of the fuel. A is a parameter to control the dropping speed of the estimated pressure Pe. V is a total volume of the piping 44 and the delivery pipe 60. Note that when the volume of the piping 44 can be ignored in comparison with the volume of the delivery pipe 60, the volume of the delivery pipe 60 may be V. As the injection amount q, a command value of the fuel injected with the fuel injection valve 62 may be used. Otherwise the injection amount may be estimated based on the detection pressure Pm and valve opening time of the fuel injection valve 62, or may be estimated based on change in the detection pressure Pm. As the bulk modulus of elasticity K, the bulk modulus of elasticity of the fuel to be used may be previously set. Note that the bulk modulus of elasticity K may be corrected in correspondence with fuel temperature (detection value or standard value) or fuel pressure.

Figure 5:
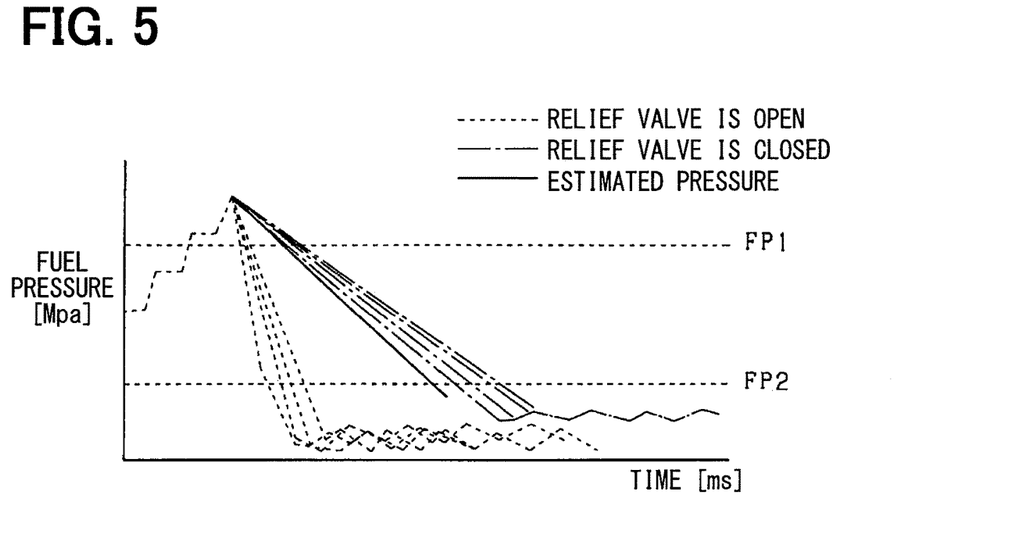
FIG. 5 is a diagram showing variation in actual fuel pressure.

The parameter A is set as follows in consideration of variation in actual fuel pressure in the delivery pipe 60. FIG. 5 is a diagram showing the variation in actual fuel pressure in the delivery pipe 60. Here, an example where the fuel pressure exceeds the injection control upper limit pressure, and subsequently the amount of fuel discharge with the high-pressure pump 30 is controlled to "0" (the fuel is not discharged with the high-pressure pump 30) will be described.

As indicated with a long dashed short dashed line in the drawing, when the relief valve 80 is in the closed status, the dropping speed of the actual fuel pressure with fuel injection varies due to viscosity (property) or temperature of the fuel, individual difference of the fuel injection valve 62, or the like. The ECU 90 sets the parameter A such that when the relief valve 80 is in the closed status and the fuel is not discharged with the high-pressure pump 30, even though the actual fuel pressure varies, the estimated pressure Pe drops faster than the actual fuel pressure. That is, the ECU 90 estimates the estimated pressure Pe such that the estimated pressure drops faster than the actual fuel pressure when the relief valve 80 is in the closed status and when the fuel is not discharged with the high-pressure pump 30, even though the actual fuel pressure varies.

Accordingly, when the relief valve 80 is in the closed status, even though the actual fuel pressure varies, the estimated pressure Pe always drops faster than the actual fuel pressure. In other words, the time at which the estimated pressure Pe decreases from the start pressure FP1 to the end pressure FP2 is always shorter than the time at which the actual fuel pressure decreases from the start pressure FP1 to the end pressure FP2. Further, when the high-pressure pump 30 breaks down and the fuel discharge amount is not controlled to "0", the actual fuel pressure is higher than the fuel pressure indicated with the long dashed short dashed line in the drawing. Accordingly, also in this case, the estimated pressure Pe always drops faster than the actual fuel pressure.

As indicated with a broken line in the drawing, when the relief valve 80 is in the open status, the speed of dropping of the actual fuel pressure also varies due to viscosity (property) or temperature of the fuel, individual difference of the fuel injection valve 62, or the like. Note that in this case, as the relief valve 80 is in the open status, the actual fuel pressure always drops faster than the estimated pressure Pe. In other words, the time at which the actual fuel pressure decreases from the start pressure FP1 to the end pressure FP2 is always shorter than the time at which the estimated pressure Pe decreases from the start pressure FP1 to the end pressure FP2. Further, when the high-pressure pump 30 breaks down and the fuel discharge amount is not controlled to "0", the actual fuel pressure is higher than the fuel pressure indicated with the broken line in the drawing. In this case, when the relief valve 80 is in the open status, the actual fuel pressure always drops faster than the estimated pressure Pe.

Returning to FIG. 4, at S114, the count cnt1 is set to a value obtained by adding "1" to the count cnt1 (S114). Thereafter, the process restarts from the processing at S112. Note that in the processing at S112 to S114, the processing at S112 and the processing at S114 are performed at a predetermined control period (e.g. 1 ms period). The processing at S113 is performed at 180° C.A period. Accordingly, the count cnt 1 represents an estimation time [ms] where the estimated pressure Pe is equal to or higher than the end pressure FP2.

In the determination at S112, on determination that the estimated pressure Pe is not equal to or higher than the end pressure FP2 (S112: NO), an estimation f (flag) indicating whether or not the estimation time calculation has been completed is set to "1" (S115). Note that the initial value of the estimation f is "0". When the estimated pressure Pe is equal to or higher than the end pressure FP2, the estimation f is "0". Thereafter, this series of processing is ended (END). Note that the processing at S111 to S115 corresponds to processing as the estimation unit.

Figure 6:
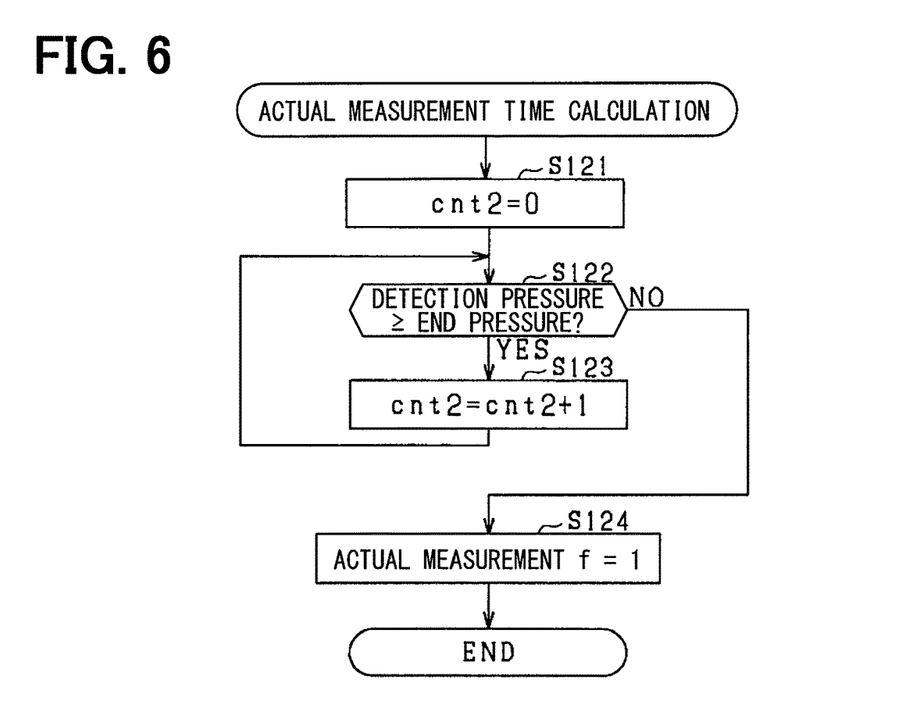
FIG. 6 is a flowchart showing a procedure of actual measurement time calculation according to the first embodiment.

FIG. 6 is a flowchart showing a procedure of actual measurement time calculation according to the present embodiment. This series of processing is performed with the ECU 90.

A count cnt2 is set to "0" (S121). It is determined whether or not the detection pressure Pm detected with the pressure sensor 82 is equal to or higher than the end pressure FP2 (corresponding to the second pressure) (S122).

In the determination at S122, on determination that the detection pressure Pm is equal to or higher than the end pressure FP2 (S122: YES), the count cnt2 is set to a value obtained by adding "1" to the count cnt2 (S123). Thereafter, the process restarts from the processing at S122. Note that the processing at S122 and S123 is performed at a predetermined control period (e.g. 1 ms period). Accordingly, the count cnt2 represents an actual measurement time [ms] where the detection pressure Pm is equal to or higher than the end pressure FP2.

Figure 7:
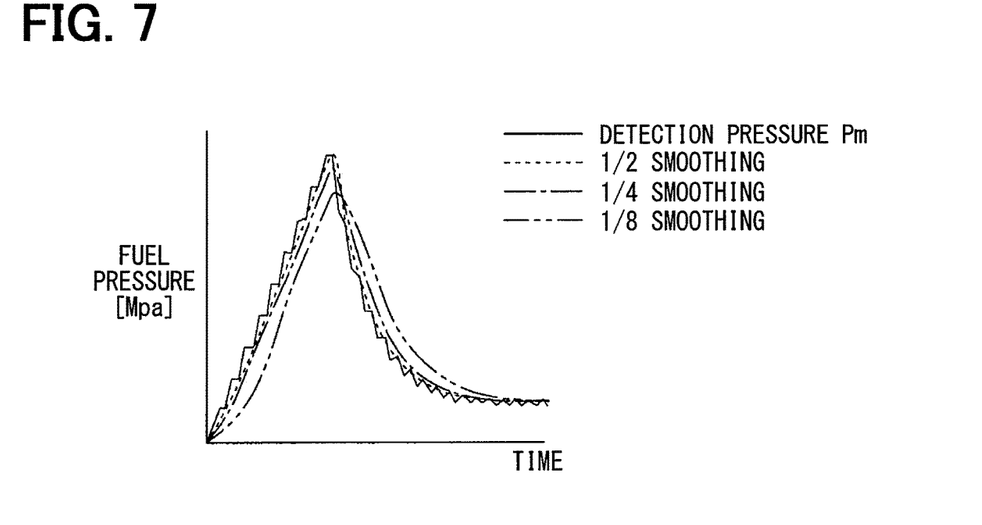
FIG. 7 is a diagram showing the relationship between smoothing degree of detection pressure and smoothed detection pressure.

FIG. 7 is a diagram showing the relationship between smoothing degree of the detection pressure Pm and smoothed detection pressure Pmn. The solid line indicates the detection pressure Pm. When the detection pressure Pm is smoothed to 1/n, the smoothed detection pressure Pmn (k) is represented with the following expression.

$$Pmn(k)=Pmn(k-1)\times(1-1/n)+Pm\times(1/n)$$

In the above expression, Pmn (k) is a current value of the smoothed detection pressure Pmn. Pmn (k−1) is a previous value of the smoothed detection pressure Pmn. 1/n is a smoothing coefficient.

As shown in the drawing, as the smoothing coefficient is smaller (the degree of smoothing is higher), the smoothed detection pressure Pmn changes behind the detection pressure Pm, and the peak of the smoothed detection pressure Pmn is lower than the peak of the detection pressure Pm. Note that the higher the engine speed of the engine 10 is, the higher the rising speed and dropping speed of the detection pressure Pm are. Accordingly, the higher the engine speed of the engine 10 is, the greater the difference between the detection pressure Pm and the smoothed detection pressure Pmn is. Accordingly, it may be configured such that in the processing at S111 in FIG. 4 and the processing at S122 in FIG. 6, when the detection pressure Pm is smoothed and used for the purpose of suppression of pulse and noise influence on the detection pressure Pm, the higher the engine speed of the engine 10 is, the greater the smoothing coefficient is (the smoothing degree is weakened).

Returning to FIG. 6, in the determination at S122, on determination that the detection pressure Pm is not equal to or higher than the end pressure FP2 (S122: NO), an actual measurement f indicating whether or not the actual measurement time calculation has been completed is set to "1". Note that the initial value of the actual measurement f is "0". When the detection pressure Pm is equal to or higher than the end pressure FP2, the actual measurement f is "0". Thereafter, this series of processing is ended (END). Further, it may be configured such that upper limit time to repeat the processing at S122 and S123 is set, and when time to repetitively perform the processing at S123 and S124 exceeds the upper limit time, the process proceeds to the processing at S13 in FIG. 3 while the actual measurement f is "0".

Returning to FIG. 3, at S13, it is determined whether or not estimation f=1 holds and actual measurement f=1 holds (S13). In this determination, on determination that estimation f=1 holds and actual measurement f=1 holds (S13: YES), it is determined whether or not a value obtained by subtracting the count cnt2 from the count cnt1 is greater than a determination value (S14). The determination value is set to "0" or a predetermined value greater than "0".

In the determination at S14, on determination that the value obtained by subtracting the count cnt2 from the count cnt1 is greater than the determination value (S14: YES), a valve open f indicating whether or not the relief valve 80 is in the open status is set to "1". That is, when the time at which the detection pressure Pm decreases from the start pressure FP1 to the end pressure FP2 is shorter than the time at which the estimated pressure Pe decreases from the start pressure FP1 to the end pressure FP2, it is determined that the relief valve 80 is in the open status. In other words, when the detection pressure Pm changes while it is lower than the estimated pressure Pe, it is determined that the relief valve 80 is in the open status. In short, it is determined that the relief valve 80 is in the open status based on the dropping mode of the estimated pressure Pe and the dropping mode of the detection pressure Pm. Thereafter, this series of processing is ended (END).

On the other hand, in the determination at S14, on determination that the value obtained by subtracting the count cnt2 from the count cnt1 is not greater than the determination value (S14: NO), the valve open f is set to "0". That is, when the time at which the detection pressure Pm decreases from the start pressure FP1 to the end pressure FP2 is longer than the time at which the estimated pressure Pe decreases from the start pressure FP1 to the end pressure FP2, it is determined that the relief valve 80 is in the closed status. In other words, when the detection pressure Pm changes while it is equal to or higher than the estimated pressure Pe, it is determined that the relief valve 80 is in the closed status. In short, it is determined that the relief valve 80 is in the closed status based on the dropping mode of the estimated pressure Pe and the dropping mode of the detection pressure Pm. Thereafter, this series of processing is ended (END).

Further, in the determination at S13, on determination that at least one of the estimation f and the actual measurement f is not "1" (S13: NO), this series of processing is ended (END). Note that the initial value of the valve open f is "0". In this case, the valve open f is "0".

Note that the processing at S11 corresponds to processing as the estimation unit, and the processing at S13 to S16 corresponds to processing as the determination unit.

Figure 8:
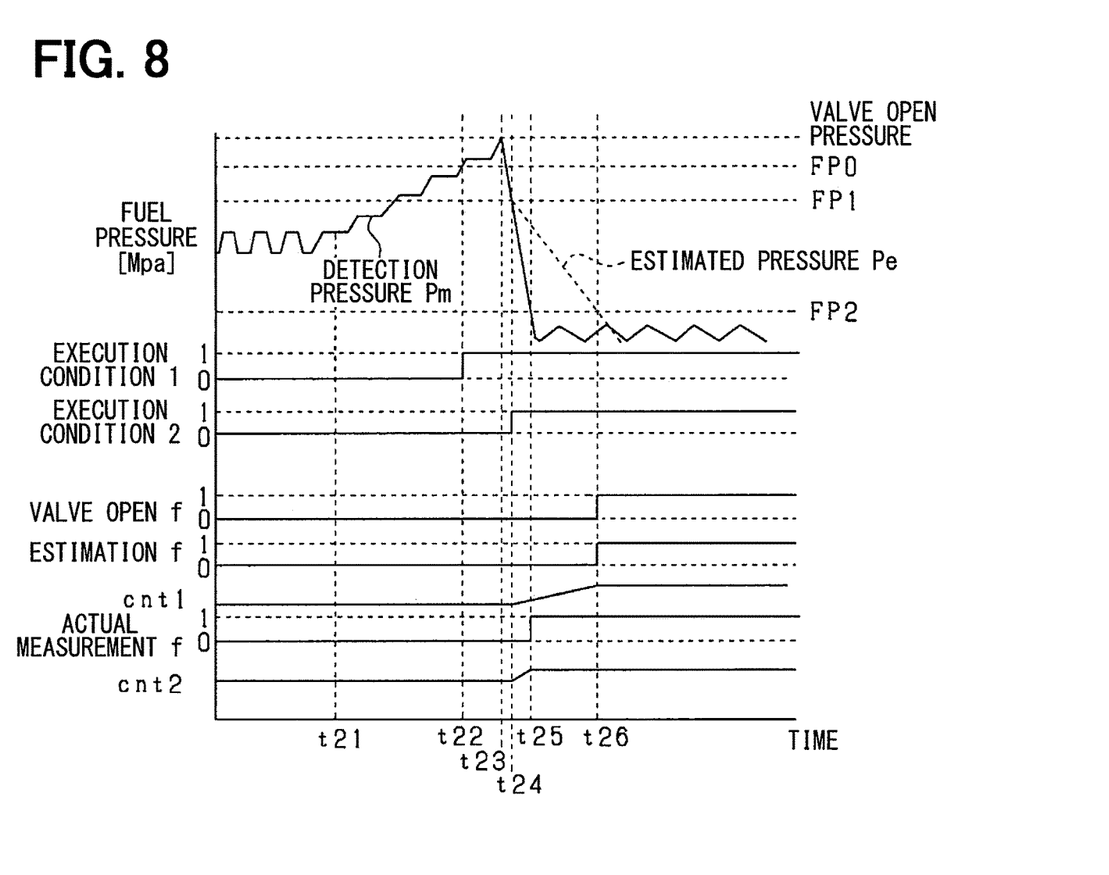
FIG. 8 is a time chart showing an operation example in correspondence with relief valve determination according to the first embodiment.

FIG. 8 is a time chart showing an operation example in correspondence with relief valve determination according to the present embodiment.

At time t21, the high-pressure pump 30 breaks down, and the detection pressure Pm detected with the pressure sensor 82 starts to rise. At time t22, when the detection pressure Pm exceeds pressure FP0, the execution condition 1 is established. At time t23, when the fuel pressure which acts on the relief valve 80 exceeds the valve open pressure, the relief valve 80 becomes in the open status. Subsequently, the detection pressure Pm starts to drop.

At time t24, when the detection pressure Pm becomes lower than the start pressure FP1, the execution condition 2 is established. Accordingly, calculation of the count cnt1 (estimation time) and the count cnt2 (actual measurement time) is started, and incrementation of the count cnt1 and the count cnt2 is started.

At time t25, when the detection pressure Pm becomes lower than the end pressure FP2, the incrementation of the count cnt2 is ended, and the actual measurement f becomes "1". At time t26, when the estimated pressure Pe becomes less than the end pressure FP2, the incrementation of the count cnt1 is ended, and the estimation f becomes "1". Subsequently, on determination that the value obtained by subtracting the count cnt2 from the count cnt1 is greater than the determination value, and the valve open f becomes "1". With this configuration, it is determined that the relief valve 80 is in the open status.

The present embodiment described in detail as above has the following advantages.

Assuming that the fuel has not been discharged with the high-pressure pump 30 from a time point where the detection pressure Pm detected with the pressure sensor 82 changes from the higher status than the start pressure FP1 to the lower status, the ECU 90 estimates the estimated pressure Pe on the discharge side of the high-pressure pump 30 based on the amount of fuel injection with the fuel injection valve 62. Note that when the relief valve 80 is in the open status, the detection pressure Pm changes while it is lower than the estimated pressure Pe regardless of whether the fuel is discharged with the high-pressure pump 30 or not. Accordingly, the ECU 90 determines that the relief valve 80 is in the open status based on the dropping mode of the estimated pressure Pe and the dropping mode of the detection pressure Pm.

The ECU 90 estimates the estimated pressure Pe on the assumption that the fuel is not discharged with the high-pressure pump 30. Therefore, it is not necessary to perform the estimation on the assumption of feed-back control of the amount of discharge with the high-pressure pump 30. Accordingly, even when the amount of discharge with the high-pressure pump 30 is not feed-back controlled, it is possible to determine that the relief valve 80 is in the open status. Note that when the amount of discharge with the high-pressure pump 30 is feed-back controlled, it is similarly possible to determine that the relief valve 80 is in the open status.

The actual fuel pressure on the discharge side of the high-pressure pump 30 varies due to the property or the temperature of the fuel, individual difference of the fuel injection valve 62, or the like. In this point, when the relief valve 80 is in the closed status and the fuel is not discharged with the high-pressure pump 30, even though the actual fuel pressure on the discharge side varies, the ECU 90 estimates the estimated pressure Pe such that the estimated pressure Pe drops faster than the actual fuel pressure on the discharge side. Accordingly, even though the actual fuel pressure on the discharge side varies, when the detection pressure Pm changes while being lower than the estimated pressure Pe, it is possible to determine that the relief valve 80 is in the open status. On the other hand, when the detection pressure Pm changes while being equal to or higher than the estimated pressure Pe, it is possible to determine that the relief valve 80 is in the closed status.

It is determined whether or not the relief valve 80 is in the open status based on the time at which the detection pressure Pm decreases from the start pressure FP1 to the end pressure FP2. Accordingly, in comparison with the configuration where it is determined whether or not the relief valve 80 is in the open status based on the detection pressure Pm, it is possible to suppress the influence of variation in the fuel pressure.

When the time at which the detection pressure Pm decreases from the start pressure FP1 to the end pressure FP2 is shorter than the time at which the estimated pressure Pe decreases from the start pressure FP1 to the end pressure FP2, the ECU 90 determines that the relief valve 80 is in the open status.

The estimated pressure Pe is estimated based on the amount of fuel injection with the fuel injection valve 62, the bulk modulus of elasticity K of the fuel, and the temperature of the fuel. Accordingly, it is possible to appropriately estimate the estimated pressure Pe in correspondence with property or temperature of the fuel.

Second Embodiment

Hereinbelow, a second embodiment will be described mainly regarding the difference from the first embodiment. In the present embodiment, the ECU 90 determines whether or not the relief valve 80 is in the open status when at least one of the estimated pressure Pe and the detection pressure Pm decreases to the end pressure FP2 set to be lower than the start pressure FP1. Note that the elements the same as those in the first embodiment have the same reference numerals, and detailed explanations will be omitted.

Figure 9:
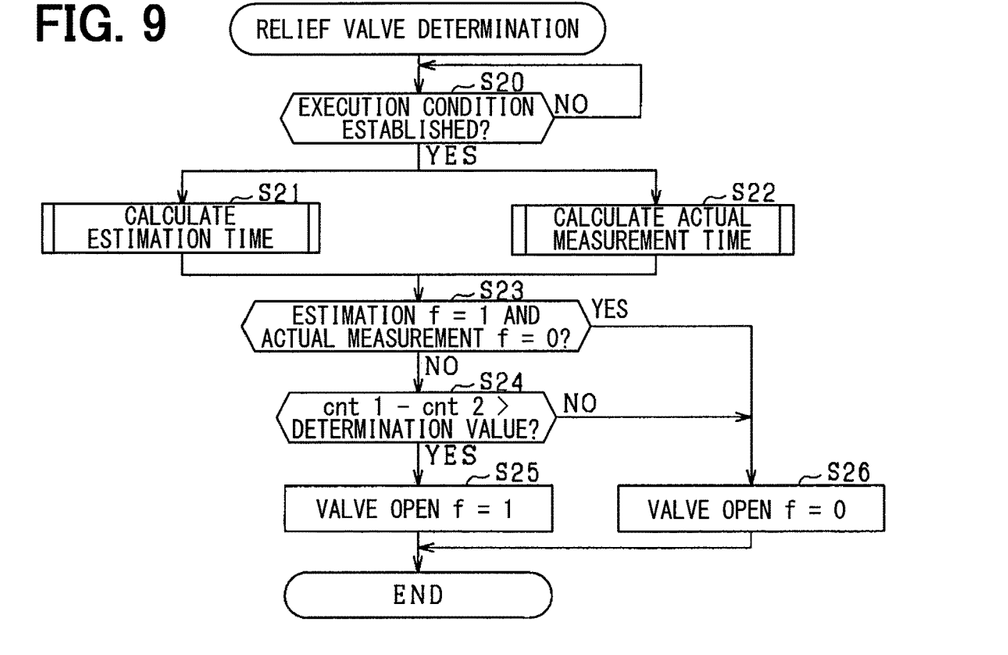
FIG. 9 is a flowchart showing the procedure of relief valve determination according to a second embodiment.

FIG. 9 is a flowchart showing the procedure of the relief valve determination according to the present embodiment. This series of processing is performed with the ECU 90.

First, it is determined whether or not the execution condition of the relief valve determination is established (S20). More particularly, on the presumption that the detection pressure Pm detected with the pressure sensor 82 decreases below the start pressure FP1 (corresponding to the first pressure), it is determined that the execution condition of the relief valve determination is established.

In the determination at S20, on determination that the execution condition of the relief valve determination is not established (S20: NO), the processing at S20 is performed again. On the other hand, in the determination at S20, on determination that the execution condition of the relief valve determination is established (S20: YES), the estimation time calculation (S21) and the actual measurement time calculation (S22) are performed in parallel. Note that it may be configured such that one of the estimation time calculation (S21) and the actual measurement time calculation (S22) is performed and then the other calculation is performed.

Figure 10:
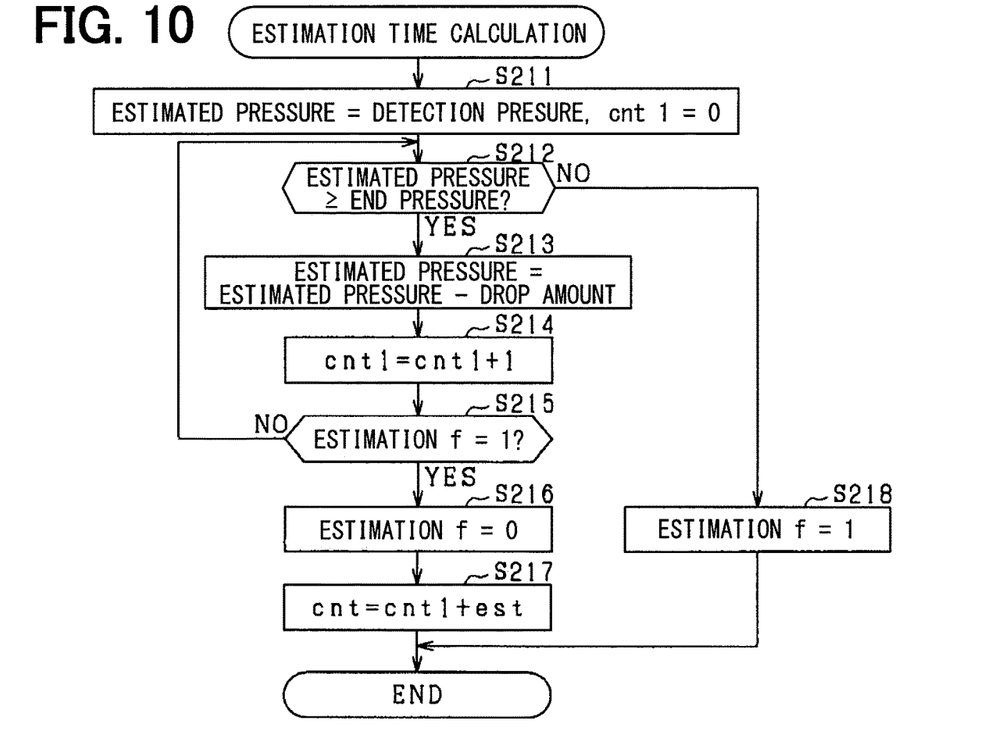
FIG. 10 is a flowchart showing the procedure of estimation time calculation according to the second embodiment.

FIG. 10 is a flowchart showing the procedure of the estimation time calculation according to the present embodiment. This series of processing is performed with the ECU 90.

The processing at S212 to S214 is the same as the processing at S112 to S114.

At S215, it is determined whether or not the actual measurement f is "1" (S215). In this determination, on determination that the actual measurement f is not "1" (S215: NO), the process restarts from the processing at S212. On the other hand, in this determination, on determination that the actual measurement f is "1" (S215: YES), the estimation f which indicates whether or not the estimation time calculation has been completed is set to "0". That is, as the calculation of the count cnt1 (estimation time) has not been completed, the estimation f is set to "0".

Next, the count cnt1 is set to a value obtained by adding a count est to the count cnt1 (S217). The count est is a value corresponding to a time period from a time point at which the actual measurement f becomes 1 (i.e., the detection pressure Pm becomes lower than the end pressure FP2) to a time point at which the estimated pressure Pe becomes lower than the FP2. Thereafter, this series of processing is ended (END).

Figure 11:
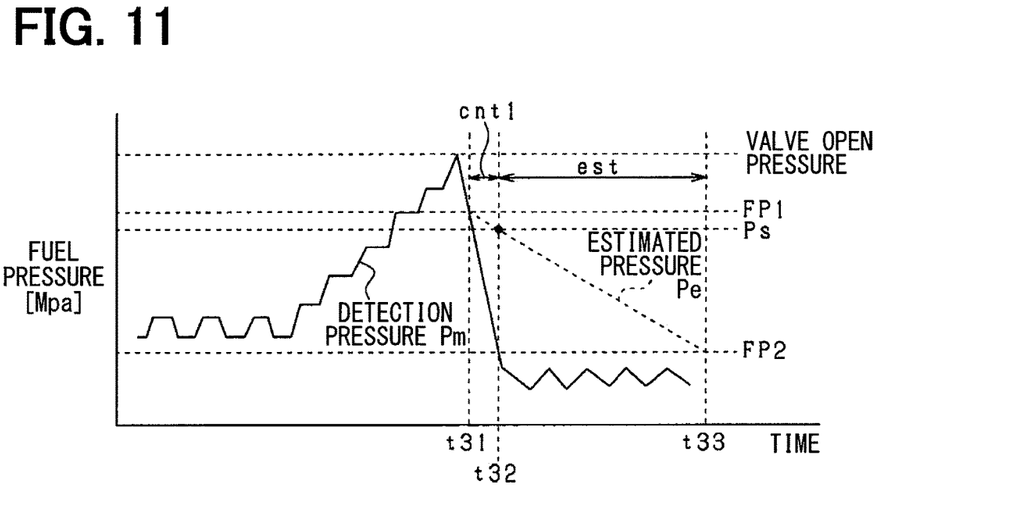
FIG. 11 is a time chart showing the procedure of estimation time calculation according to the second embodiment.

FIG. 11 is a time chart showing the procedure of the estimation time calculation according to the present embodiment. At time t31, when the detection pressure Pm decreases below the start pressure FP1, the incrementation of the count cnt1 is started.

At time t32, when the detection pressure Pm becomes lower than the end pressure FP2, the actual measurement f becomes "1". At this time, the count cnt1 is a value corresponding to the time t31 to t32. Subsequently, the count est is calculated with the following expression.

$$est = (60/2/NE) \times (Ps - FP2)/\Delta P$$

In the above expression, NE is an engine speed [rpm] of the engine 10. Ps is the estimated pressure Pe when the detection pressure Pm becomes lower than the end pressure FP2. ΔP is a drop amount the same as that in the first embodiment. Note that to prevent changing of the engine speed NE to "0", a lower limit value (e.g. idle speed) of the engine speed NE is set (lower limit guard). Further, to prevent changing of the drop amount ΔP to "0", a lower limit value of the fuel injection amount q is set (lower limit guard) upon calculation of ΔP. More particularly, a minimum injection amount injectable with the fuel injection valve 62 is set as the lower limit value of the injection amount q.

Returning to FIG. 10, in the determination at S212, on determination that the estimated pressure Pe is not equal to or higher than the end pressure FP2 (S212: NO), the estimation f which indicates whether or not the estimation time calculation has been completed is set to "1" (S218). Thereafter, this series of processing is ended (END). Note that the processing at S211 to S218 corresponds to the processing as the estimation unit.

Figure 12:
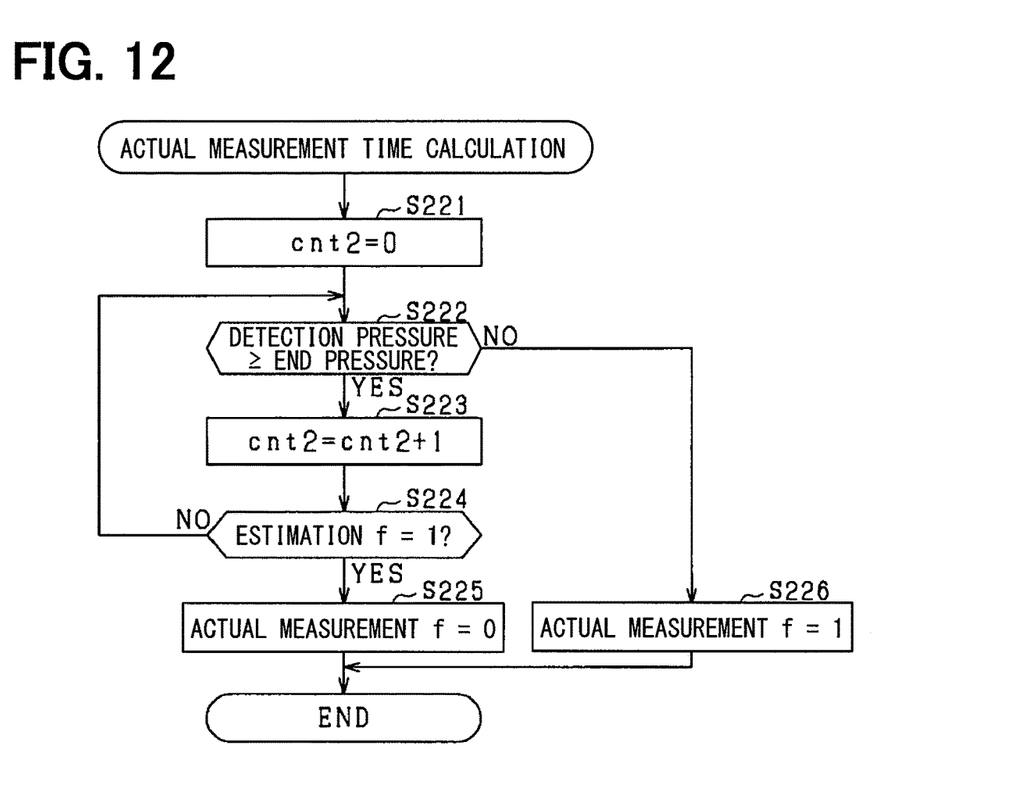
FIG. 12 is a flowchart showing the procedure of the actual measurement time calculation according to the second embodiment.

FIG. 12 is a flowchart showing the procedure of the actual measurement time calculation according to the present embodiment. This series of processing is performed with the ECU 90.

The processing at S221 to S223 is the same as the processing at S121 to S123 in FIG. 6.

At S224, it is determined whether or not the estimation f is "1" (S224). In this determination, on determination that the estimation f is not "1" (S224: NO), the process restarts from the processing at S222. On the other hand, in this determination, on determination that the estimation f is "1"

(S224: YES), the actual measurement f which indicates whether or not the actual measurement time calculation has been completed is set to "0". That is, since the calculation of the count cnt2 (actual measurement time) has not been completed, the actual measurement f is set to "0". Thereafter, this series of processing is ended (END).

Further, in the determination at S222, on determination that the detection pressure Pm is not equal to or higher than the end pressure FP2 (S222: NO), the actual measurement f is set to "1" (S226). Thereafter, this series of processing is ended (END).

Returning to FIG. 9, at S23, it is determined whether or not estimation f=1 holds and actual measurement f=0 holds (S23). When negative determination is made in this determination (S23: NO), the process proceeds to processing at S24. The processing at S24 to S26 is the same as the processing at S14 to S16 in FIG. 3.

On the other hand, on determination that estimation f=1 holds and actual measurement f=0 holds (S23: YES) in the determination at S23, and on determination that the value obtained by subtracting the count cnt2 from the count cnt1 is not greater than the determination value in the determination at S24 (S24: NO), the valve open f which indicates whether or not the relief valve 80 is in the open status is set to "0". Thereafter, this series of processing is ended (END). Note that the processing at S21 corresponds to the processing as the estimation unit. The processing at S23 to S26 corresponds to the processing as the determination unit.

Figure 13:
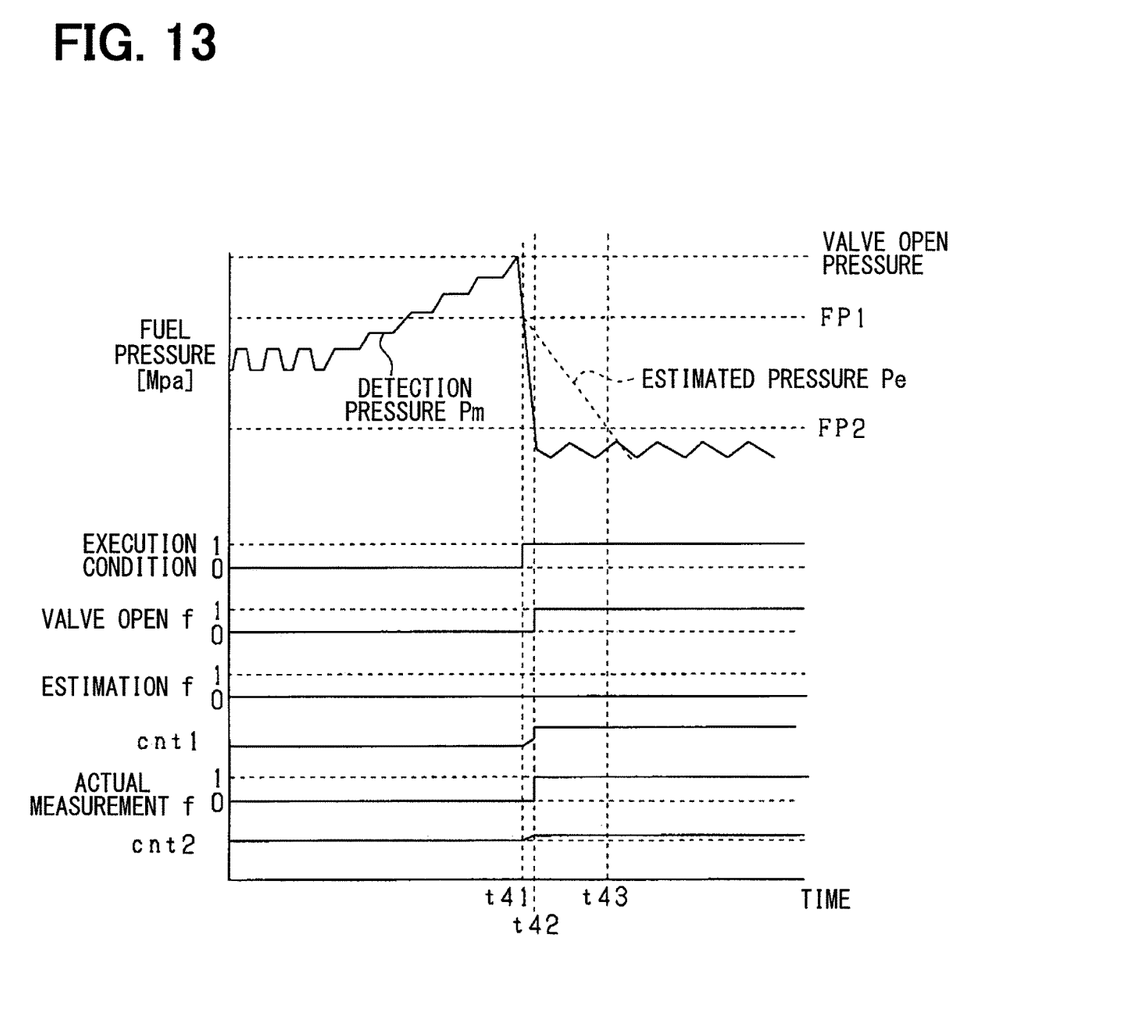
FIG. 13 is a time chart showing the operation example in correspondence with the relief valve determination according to the second embodiment.

FIG. 13 is a time chart showing the operation example in correspondence with the relief valve determination according to the present embodiment. Here, the operation example at time t41 corresponding to the time t24 in FIG. 8 and the subsequent time will be described.

At the time t41, when the detection pressure Pm decreases below the start pressure FP1, the execution condition is established. Accordingly, the calculation of the count cnt1 (estimation time) and the count cnt2 (actual measurement time) is started, and incrementation of the counts cnt1 and cnt2 is started.

At time t42, when the detection pressure Pm is lower than the end pressure FP2, the incrementation of the count cnt2 is ended and the actual measurement f becomes "1". Subsequently, the count cnt1 is set to a value obtained by adding the count est to the count cnt1. Further, it is determined that the value obtained by subtracting the count cnt2 from the count cnt1 is greater than the determination value, and the valve open f becomes "1". With this configuration, it is determined that the relief valve 80 is in the open status. Note that the estimation f is still "0".

The present embodiment described in detail as above has the following advantages. Here, only the advantages different from the first embodiment will be described.

The ECU 90 determines whether or not the relief valve 80 is in the open status when at least one of the estimated pressure Pe and the detection pressure Pm decreases to the end pressure FP2 set to be lower than the start pressure FP1. When the detection pressure Pm decreases to the end pressure FP2 prior to the estimated pressure Pe, it is determined that the relief valve 80 is in the open status. Accordingly, it is possible to determine whether or not the relief valve 80 is in the open status when at least one of the estimated pressure Pe and the detection pressure Pm decreases to the end pressure FP2. When it is determined that the relief valve 80 is in the open status, it is possible to perform fail-safe processing or the like at an early stage.

When the detection pressure Pm decreases to the end pressure FP2 prior to the estimated pressure Pe, the time period in which the estimated pressure Pe decreases from the start pressure FP1 to the end pressure FP2 is estimated, and it is determined whether or not the relief valve 80 is in the open status. Accordingly, on determination that the relief valve 80 is in the open status, it is possible to perform fail-safe processing or the like at an early stage.

Note that the above-described embodiments may be changed and implemented as follows. The elements the same as those in the above-described embodiments will have the same reference numerals, and explanations of the elements will be omitted.

It may be configured such that when the determination pressure Pm first drops from the start pressure FP1 to the end pressure FP2, the ECU 90 (corresponding to the determination unit) determines that the relief valve 80 is in the open status, and when the estimated pressure Pe first drops, it is determined that the relief valve 80 is in the closed status.

The pressure FP0, the start pressure FP1, and the end pressure FP2 may be set in correspondence with engine speed of the engine 10.

It is also possible to control the dropping speed of the estimated pressure Pe by correcting at least one of the injection amount q, the volume V, and the bulk modulus of elasticity K, in place of using the parameter A.

It is also possible to return the fuel with the relief valve 80 from the delivery pipe 60 to the piping 22 or the fuel tank 18.

It is also possible to adopt an electric powered high-pressure pump driven with a rotary electric machine as the high-pressure pump 30.

It is also possible to adopt, not only a direct fuel-injection engine using gasoline as fuel, but also a direct fuel-injection engine using ethanol or the like as fuel, a diesel engine provided with a common rail, as the engine 10.

The present disclosure has been described in accordance with the embodiments, however, it is understood that the present disclosure is not limited to the embodiments and structures. The present invention includes various changes within the scope described in the claims. In addition, various combinations and forms, and further, other combinations and forms including only one element, or more, or less, are included in the scope and idea of the present invention.

The invention claimed is:

1. A relief valve determination device configured to determine that a relief valve is in an open status in a high-pressure fuel supply system, the high-pressure fuel supply system including:
a fuel injection valve configured to inject fuel;
a high-pressure pump configured to pressurize the fuel and to discharge the fuel to a supply path that is directed to the fuel injection valve;
a pressure sensor configured to detect a fuel pressure on a discharge side of the high-pressure pump; and
the relief valve configured to become in an open status, when the fuel pressure on the discharge side is higher than a valve open pressure, to decrease the fuel pressure on the discharge side to a predetermined pressure,
the relief valve determination device comprising:
an estimation unit configured to estimate the fuel pressure on the discharge side based on an amount of fuel injection with the fuel injection valve from a time point where the fuel pressure detected with the pressure sensor changes from a higher status than a first pressure, which is set to be lower than the valve open pressure, to a lower status, assuming that the fuel is not discharged with the high-pressure pump; and a determination unit configured to determine that the relief valve is in the open status based on a dropping mode of the fuel pressure estimated with the estimation unit and a dropping mode of the fuel pressure detected with the pressure sensor.

2. The relief valve determination device according to claim 1, wherein the determination unit is configured to determine whether or not the relief valve is in the open status when at least one of the fuel pressure estimated with the estimation unit and the fuel pressure detected with the pressure sensor decreases to a second pressure set to be lower than the first pressure.

3. The relief valve determination device according to claim 2, wherein the determination unit is configured to determine whether or not the relief valve is in the open status based on a time period in which the fuel pressure estimated with the estimation unit decreases from the first pressure to the second pressure and a time period in which the fuel pressure detected with the pressure sensor decreases from the first pressure to the second pressure, and to estimate, when the fuel pressure detected with the pressure sensor decreases to the second pressure prior to the fuel pressure estimated with the estimation unit, a time period in which the fuel pressure estimated with the estimation unit decreases from the first pressure to the second pressure.

4. The relief valve determination device according to claim 1, wherein the estimation unit is configured to estimate the fuel pressure on the discharge side so as to drop faster than an actual fuel pressure on the discharge side, when the relief valve is in a closed status and when the fuel is not discharged with the high-pressure pump, even though the actual fuel pressure on the discharge side varies.

5. The relief valve determination device according to claim 1, wherein the estimation unit is configured to estimate the fuel pressure on the discharge side so as to drop faster than the actual fuel pressure on the discharge side, when the relief valve is in a closed status and when the fuel is not discharged with the high-pressure pump, even though the actual fuel pressure on the discharge side varies, and the determination unit is configured to determine that the relief valve is in the open status when a time period in which the fuel pressure detected with the pressure sensor decreases from the first pressure to a second pressure, which is set to be lower than the first pressure, is shorter than a time period in which the fuel pressure estimated with the estimation unit decreases from the first pressure to the second pressure.

6. The relief valve determination device according to claim 1, wherein the estimation unit is configured to estimate the fuel pressure on the discharge side based on the amount of fuel injection with the fuel injection valve, a bulk modulus of elasticity of the fuel, and a fuel temperature.

7. A relief valve determination device comprising:

a computer coupled to a pressure sensor, the pressure sensor configured to detect, as a detected fuel pressure, a fuel pressure in a supply path of a high-pressure pump, the supply path being connected to a fuel injection valve and provided with a relief valve, the relief valve being configured to be in an open status at a valve open pressure, in which the relief valve opens to decrease the fuel pressure, the computer configured to perform:

receiving the detected fuel pressure from the pressure sensor in a detection time period in which the detected fuel pressure linearly decreases from a first pressure, which is lower than the valve open pressure, to be a second pressure, which is lower than the first pressure;

estimating, as an estimated fuel pressure, a fuel pressure in the fuel path based on an amount of fuel injection with the fuel injection valve, without based on an amount of the fuel discharged with the high-pressure pump, and regardless of a variation in the fuel pressure;

estimating an estimation time period in which the estimated fuel pressure decreases from the first pressure to be the second pressure; and determining that the relief valve is in the open status on determination that the detection time period is less than the estimation time period.

8. The relief valve determination device according to claim 7, wherein the computer is configured to estimate the estimated fuel pressure based on only the amount of fuel injection in the estimation time period.

9. A method for determining a status of a relief valve, the relief valve provided to a supply path, which is connected from a high-pressure pump to a fuel injection valve, and configured to be in an open status at a valve open pressure, in which the relief valve opens to decrease a fuel pressure in the supply path, the method comprising:

receiving a detected fuel pressure from a pressure sensor provided to the supply path in a detection time period in which a detected fuel pressure linearly decreases from a first pressure, which is lower than the valve open pressure, to be a second pressure, which is lower than the first pressure;

estimating, as an estimated fuel pressure, a fuel pressure in the fuel path based on an amount of fuel injection with the fuel injection valve, without based on an amount of the fuel discharged with the high-pressure pump, and regardless of a variation in the fuel pressure;

estimating an estimation time period in which the estimated fuel pressure decreases from the first pressure to the second pressure; and determining that the relief valve is in the open status on determination that the detection time period is less than the estimation time period.

10. The method according to claim 9, wherein the estimated fuel pressure is estimated based on only the amount of fuel injection in the estimation time period.

* * * * *